(12) United States Patent
Sturkenboom et al.

(10) Patent No.: US 10,299,485 B2
(45) Date of Patent: *May 28, 2019

(54) METHOD FOR PREPARING A FLOUR TORTILLA

(71) Applicant: MAURI TECHNOLOGY B.V., Made (NL)

(72) Inventors: Marcellus Gerardus Sturkenboom, Houten (NL); Mattheus Antonius Jozef van der Lee, Maasland (NL); Martinus Gerardus van Oort, Nieuwegein (NL); Steven Charles Bright, Fenton, MO (US)

(73) Assignee: MAURI TECHNOLOGY B.V., Made (NL)

( * ) Notice: Subject to any disclaimer, the term of this patent is extended or adjusted under 35 U.S.C. 154(b) by 161 days.

This patent is subject to a terminal disclaimer.

(21) Appl. No.: 15/366,580

(22) Filed: Dec. 1, 2016

(65) Prior Publication Data

US 2017/0079288 A1 Mar. 23, 2017

Related U.S. Application Data

(62) Division of application No. 12/237,819, filed on Sep. 25, 2008, now Pat. No. 9,549,561.

(60) Provisional application No. 60/995,552, filed on Sep. 27, 2007.

(30) Foreign Application Priority Data

Sep. 27, 2007 (EP) ..................................... 07117317

(51) Int. Cl.
*A21D 13/06* (2017.01)
*A21D 13/068* (2017.01)
*A21D 2/16* (2006.01)
*A23L 7/117* (2016.01)
*A23L 7/13* (2016.01)
*A21D 13/42* (2017.01)
*A21D 13/22* (2017.01)

(52) U.S. Cl.
CPC .............. *A21D 13/068* (2013.01); *A21D 2/16* (2013.01); *A21D 13/22* (2017.01); *A21D 13/42* (2017.01); *A23L 7/117* (2016.08); *A23L 7/13* (2016.08)

(58) Field of Classification Search
CPC .... A21D 13/068; A21D 2/06; A21D 13/0006; A21D 13/0074; A23L 7/117
See application file for complete search history.

(56) References Cited

U.S. PATENT DOCUMENTS

| 1,613,867 | A | * | 1/1927 | Ball | A21C 11/16 |
| | | | | | 425/311 |
| 2,636,470 | A | * | 4/1953 | Rhodes | A21B 5/085 |
| | | | | | 118/16 |
| 4,735,811 | A | * | 4/1988 | Skarra | A21D 13/42 |
| | | | | | 426/138 |
| 5,510,126 | A | * | 4/1996 | Van Eijk | A21D 2/267 |
| | | | | | 426/19 |
| 2002/0094367 | A1 | * | 7/2002 | Fuglsang | A21D 8/042 |
| | | | | | 426/549 |
| 2004/0009272 | A1 | * | 1/2004 | Lonergan | A23P 20/12 |
| | | | | | 426/302 |
| 2007/0059340 | A1 | * | 3/2007 | Bello | A21D 2/16 |
| | | | | | 424/439 |

OTHER PUBLICATIONS

"Wheat and Flour Testing Methods". Published by Wheat Marketing Center, Wheat and Flour Testing Methods, A guide to understanding wheat and flour quality, Version 2, Kansas State University, Sep. 2008. (Year: 2008).*
Harmon, Wardee, "Whole Wheat Tortillas (Soaked)", dated Apr. 28, 2006, Internet article, Retrieved from URL: https://traditionalcookingschool/com/food-preparation/recipes/whole-wheat-tortillas.
Manjula's Kitchen, "Roti, Chapati (Flat Indian Bread", dated Mar. 21, 2007, Internet Article, Retrieved from URL: http://www.manjulaskitchen.com/roti-chapati-flat-indian-bread.
YouTube video: https://www.vahrehvah.com/chapati.
Aayis Recipes, "Chapathi and Phulkas", dated Jul. 30, 2006, Internet Article, Retrieved from URL: http://www.aayisrecipes.com/information-center/chapathi-and-phulkas.
Grand Wrap Flatbread Makers, "Recipe and Instruction Booklet", for Model Nos. 2155 and 5955; Cpyright VillaWare Manufacturing Company; Internet Article, Retrieved from URL: http://ec1.images-amazon.com/media/i3d/01/A/man-migrate/MANUAL000046402.pdf.

* cited by examiner

*Primary Examiner* — Jenna A Watts
(74) *Attorney, Agent, or Firm* — Hoffmann & Baron, LLP

(57) ABSTRACT

The disclosure defined by this invention describes a method for preparing a flour tortilla (including whole wheat or multi grain) which utilizes a fatty substance in the form of a powder, granulate or crystal to improve the properties of the tortilla.

18 Claims, No Drawings

METHOD FOR PREPARING A FLOUR TORTILLA

CROSS-REFERENCE TO RELATED APPLICATIONS

This application claims the benefit of priority from U.S. application Ser. No. 12/237,819 which was filed Sep. 25, 2008 and has issued as U.S. Pat. No. 9,549,561, which claims priority to U.S. Provisional Patent Application No. 60/995,552 filed Sep. 27, 2007 and European Patent Application No. 07117317.3 filed Sep. 27, 2007, the disclosures of which are incorporated herein by reference.

The invention relates to a method for preparing a flour tortilla (including whole wheat, multi grain), to a tortilla obtainable by such a method and to the use of a fatty substance to improve a property of a tortilla prepared using a fatty substance.

Flour tortillas are a unique baked product, made from cereal flour, usually maize or wheat.

Wheat flour tortillas are gluten structured, just like bread. Almost all tortillas are chemically leavened, baked quickly and cooled to ambient temperatures in less than 15 minutes.

Flour tortillas have soft, silky, smooth texture, are opaque and fluffy and have excellent pliability; are resistant to cracking and have small, evenly distributed blisters. Blisters create desirable characteristics in the final product, showing up as lightly browned spots on the surface.

Flour tortillas are becoming increasing popular, for instance as a substitute for bread, rolls and buns.

Flour tortillas can be made by making a dough from flour, fat and salt and water. Most large commercial tortilla manufacturers use the hot-press method of mixing, forming and baking to produce flour tortillas, e.g. as described in Bello, A. B.; Serna-Saldivar, S. O.; Waniska, R. D. and Rooney, L. W. Methods to prepare and evaluate wheat tortillas, Cereal Foods World (1991)

In this method, a smooth dough comprising flour, water, fat, salt, and usually one or more ingredients selected from baking powder, yeast, preservatives, gums, reducing agents and emulsifiers is mixed to an extensible, elastic, non-sticky and relatively firm dough.

By optimally mixing and adding proper water levels a silky, smooth-textured dough, with many layers in the final product is formed.

Dough temperature also affects consistency, with lower dough temperatures increasing water absorption. This leads to a softer final product. The temperature may for instance be in the range of 27-38° C. The optimum temperature for flour-tortilla dough is usually 27° to 33.5° C.

After mixing, the tortilla dough is scaled to a desired weight, usually from about 30 to about 150 gram, e.g. about 40 to about 50 gram or about 45 to about 48 gram, depending on the desired diameter for the tortilla, is rounded into a ball and is then allowed to rest (relax, proof), usually for about 5-15 minutes. Proofing the dough helps the pressing process. Insufficient relaxation can result in a translucent finished product with less layering.

After resting, the dough pieces are placed under a hydraulic press that is heated. The pressing process forms a thin skin on the surface of the tortilla, limiting the escape of steam and carbon dioxide during baking. This causes the tortilla initially to form small blisters or gas pockets which deflate upon cooling.

Baking is usually done in a conveyer oven that flips the tortilla over during its journey through the oven. In particular, a specialized direct gas fired slatted belt may be used.

Baking time (oven dwell time) may for instance be approximately 30 seconds in a 190° to 235° C. oven. In a specific embodiment, the oven temperature is 190-200° C. The tortillas are then cooled and packaged.

The over-all quality of tortillas, is determined by various properties. In particular tortillas having a reduced fat content may be considered inferior to regular-fat tortillas (typically containing about 8-12 wt. % fat, for instance 8-9 wt. % fat), but also for regular-fat tortillas it is desirable to improve one or more properties.

Relevant properties in particular include:

Folding: a low tendency to break on the seams upon folding the tortilla is desired.

Breaking: it is desired that the tortilla shows good resistance against tearing. E.g. low-fat tortillas tend to be torn apart at a lower tearing force than regular tortillas.

Rolling: a good tortilla should be easily rollable, e.g. around a known diameter dowel, rod or stick, without showing substantial cracking and/or breaking. This is especially a challenge upon aging of the tortillas. Thus, it would be desirable to provide a tortilla that has good rolling properties. In particular it is desired to provide a tortilla with good rolling properties for a prolonged period of time.

Springiness: Upon taking a low fat full tortilla in one hand and crumpling or wadding it firmly, it is desirable that the tortilla 'springs back' freely and unfolds completely without breaking.

Colour: a product with a substantially uniform (off-)white colour, wherein blisters are present is appreciated by many consumers. The blisters show up as lightly browned spots on the surface. In particular, low-fat tortillas have a less off-white, more pale and less uniform colour.

Layering/lamination: a layered structure of the tortilla is desired. In particular, low-fat tortillas tend to be less layered compared to regular tortillas.

Dryness: a tortilla should preferably have a not too dry mouthfeel Consumers recognize reduced fat and low fat tortillas as having a drier mouthfeel than traditional full fat tortillas.

Size: The size (diameter) of conventional reduced fat tortillas is significantly smaller than the size of regular-fat tortillas, of the same weight. Low-fat tortillas of a specific weight may for instance have a diameter that is less than 90% of the diameter of a regular-fat tortilla of the same weight and apart from the fat having the same composition Uniformity size/shape: Reduced fat tortillas tend to be less uniform in shape and size.

Stacking stickiness: It is desired that—when stacked and packaged—tortillas show no or a low tendency to stick to one another. In particular, upon aging the tendency to stick may increase. In particular, tortillas known in the art, made with vegetable oil instead of solid shortening tend to stick more to each other upon prolonged shelf life. Also tortillas, known in the art, made with enzymes, such as bacterial or fungal amylases, tend to stick more to each other, regardless of shelf life.

Stack height: As a consequence of smaller diameters, the height of a stack of, e.g., 10 tortillas is generally higher for reduced fat tortillas than for regular fat tortillas; i.e. low fat tortillas are thicker than regular tortillas. This is unwanted due to negative effects on rollability, foldability and eating characteristics.

Opacity: Opacity is measured subjectively using a continuous scale. 100% is completely opaque (white) and 0% is completely translucent (not white). Ideally, translucency is eliminated since opacity is a desired quality attribute.

It is an objective of the present invention to provide a novel method for preparing a flour tortilla, respectively a novel flour tortilla, wherein one or more of the above properties are improved compared to a tortilla having the same composition, prepared with a known hot-press method, such as described above.

It is in particular an objective of the invention to provide a novel method for preparing a flour tortilla, respectively a novel flour tortilla with a reduced-fat content, in particular with a fat content of less than 5 wt. %. In a particularly preferred embodiment, the fat content is less than 4 wt. %, less than 3 wt. %, less than 2 wt. %, less than 1 wt. % or less, close to 0 wt. %, having one or more improved properties, compared to a known flour tortilla having the same fat content.

One or more other objectives which may be met in accordance with the invention will be apparent from the description, below.

SUMMARY OF THE INVENTION

It has now been found that by treating a flour tortilla dough in a specific way, before shaping the dough into the tortilla shape, it is possible to provide a tortilla with one or more improved properties, compared to a conventionally prepared tortilla having the same composition.

Accordingly, the present invention relates to a method for preparing a flour tortilla comprising
providing a flour tortilla dough in a portion sufficient to prepare the tortilla;
applying a fatty substance to at least part of the surface of the dough portion;
forming the dough into a tortilla shape;
and baking the dough.

For an improved result, fatty substance is usually applied to at least part of the surface prior to forming the dough into a tortilla shape. It is preferred if the fatty substance is applied to the entire surface of the dough ball.

The invention further relates to a flour tortilla obtainable in accordance with the invention.

A tortilla obtained or obtainable in accordance with the invention in particular shows one or more improved properties with respect to folding characteristics, breaking characteristics, rolling characteristics, springiness, crust colour, layering/puffing, opacity, stacking stickiness and stack height compared to a tortilla made from a dough portion of the same dough (batch), to which surface of the dough portion no fatty substance has been applied. Preferably at least three, at least four, at least five, at least six or substantially all of said properties are improved.

In particular for a reduced-fat tortilla, such as a low-fat tortilla, diameter, thickness rollability, foldability, machinability, fluffiness, layering (smoothness), opacity and/or colour (whiteness) can be improved. The diameter and/or thickness may in particular be improved by 10% or more, e.g. by up to about 20%.

In particular for a regular-fat tortilla, diameter, foldability, rollability and/or thickness can be improved.

It has further been found that in a tortilla (obtained) according to the invention shelf-life (stack sticking) may be improved.

In principle, a method of the invention can be used to prepare any type of flour tortilla. The tortilla may be selected from no-fat tortilla's, reduced fat tortilla's, low-fat tortilla's and full-fat tortilla.

Full-fat tortillas usually have an ingredient-fat content of 5-20 wt. %, in particular of 6-20 wt. %, more in particular 8-20 wt. %

A method of the invention can be used for preparing regular-fat tortillas, made from dough having a fat content) of about 8-12 wt. % (regular tortilla) or for tortillas, made from dough comprising less than 6 wt. % fat (reduced-fat tortillas), before applying the fatty substance. The fat content, as used herein is the fat content based on flour weight, unless specified otherwise. The invention is in particular advantageous with respect to providing a reduced-fat tortilla. The fat used when preparing the dough (i.e. mixed with the other ingredients from which the dough is made) may also be referred to as "ingredient fat" to distinguish it from the fatty substance applied to the surface of a portion of the dough.

The ingredient-fat content of the dough for a low-fat tortilla (as defined by the United States 21 CFR 101.62, 101.13 (1) (m)) may in particular be less than 5 wt. % on flour weight or less than 3 g per serving of a 55 g tortilla. Preferably, the fat content is of about 3 wt. % or less. More preferably the fat content is 2.5 wt. % or less. In a specific embodiment, the fat content is 2.0 wt. % or less.

DETAILED DESCRIPTION OF THE INVENTION

The dough may be prepared in a manner known per se, e.g. such as described above.

Usually wheat flour is used for preparing the dough.

Flour usually comprises gluten and other protein(s) naturally present in the flour. Optionally gluten and/or other protein is added. Usually the protein content (including gluten) is at least about 7.5 wt. %. Usually the protein content (including gluten) is about 14 wt. % or less. Preferably the flour has a protein content of at least 9.5 wt. %, in particular a protein content of 9.5-11.5 wt. %. With conventionally prepared tortillas problems have been encountered with flour containing less protein or gluten yield tortillas that crack easily and split after overnight storage. Flours with more than 11.5 wt. % gluten, however, produce doughs that take longer to mix and that require longer resting periods before pressing and baking. It is contemplated that in a method according to the invention, these drawbacks may be alleviated at least to some extent.

Usually ingredient fat is present in the form of shortening (triglycerides, essentially solid at 20° C.) This improves machinability and reduces dough stickiness. High shortening levels also help prevent cracking when the tortilla is folded or rolled. Lard and partially hydrogenated vegetable fats tend to make tortillas hard. Blending liquid oil with lard, other shortenings or partially hydrogenated liquid vegetable oils helps plasticize the tortilla. 100% vegetable oil (oil being defined as liquid at room temperature) is rarely used in conventional flour tortilla production due to excessive stack stickiness. But there is large interest from producers to use liquid oil; mainly with regards to trans-free requirements, costs, lack of clogging and absence of the need for heating the fat before usage. Thus, the present invention offers an additional advantage in that a substantial part or all of the shortening may be replaced by vegetable oil, whilst obtaining tortillas with an acceptably low stack stickiness.

An emulsifier (usually 0.3-0.8 wt. %, if present) can be present in the dough, for instance sodium-stearoyl-lactate (SSL). An emulsifier can be used to condition the dough, making it easier to handle and improving the finished texture. Mono- and diglycerides (e.g. distilled) can help to reduce shortening levels, in order to achieve a similar shortening effect. These can be used to improve tearing quality and help prevent tortillas from sticking to each other in the package. A monoglyceride may be used to provide anti-staling qualities and improve shelf life. Up to 44% improvement in shelf life has been found possible upon using the co-blended product.

A leavening agent can be present, providing puffing during the baking process, yielding a tender tortilla. Baking powder and leavening acids such as monocalcium phosphate (MCP), sodium aluminium phosphate (SALP) and sodium aluminium sulphate (SAS), sodium acid pyrophosphate (SAPP) may be used. Yeast may be used to provide the typical yeasty aroma and taste, as well as for leavening.

One or more enzymes belonging to the group of amylases, xylanases, proteases, lipases and oxidases, can be added. The enzymes may contribute to one or more desirable effects. Amylases have a positive effect on rollability and foldability, proteases have a positive effect on diameter and stack height. Xylanases and lipases have a positive effect on dough characteristics and on whiteness of the tortillas. In conventional tortillas, enzymes can have a negative effect on tortilla stickiness when used in suboptimal dosages or in suboptimal combinations. The present invention is also useful to improve (reduce) tortilla stickiness, as a result of an adverse affect of an enzyme or combination of enzymes.

A gum such as guar, carboxymethylcellulose, xanthan or gum arabic can be used to improve machinability, decrease dough stickiness, delay staling, improve rolling and folding properties, bind water, improve freeze/thaw stability and decrease moisture loss. It is advised to add gum (usually 0.1-0.5 wt. %, if present) during dry-blending to assure a homogeneous mix.

Starch can also add functionality to tortilla dough. Co-blending unmodified pregelatinized starches, such as potato starch, waxy starch, high amylose starch (usually 5-15% based on flour weight, if present) with monoglyceride can improve machinability of a tortilla dough, thus improving production capacity.

A reducing agent can be used to improve dough quality and reduce resting time. L-cysteine, sodium bisulphite or sodium metabisulphite (usually 10-40 ppm, if present) may be used improve machinability and decrease elasticity.

An oxidizing agent such as ascorbic acid, azodicarbonamide or calcium peroxide may be used to improve mixing tolerance and dough machinability.

Milk solids can be added, such as non-fat dry milk. Such ingredient can improve crumb colour, flavour or dough handling. A concentration of about 0.75 wt. % milk solids is recommended.

A preservative can be added (usually 0.1-0.75 wt. %, if present), to inhibit mould growth after packaging. Sodium and calcium propionate, organic propionates, potassium sorbates, sorbic acid are in particular suitable as tortilla preservatives.

If desired, a pH-regulator, typically an acid such as fumaric, adipic, citric, is added to control the final pH of the tortilla, which is preferably 5.5 to 6.5 at 25° C.). pH can be determined by measuring the pH directly in the dough using a pH electrode. Alternatively, the pH in the final product can be determined by homogenizing a tortilla piece with fixed weight in water and measuring the pH using a glass electrode coupled with a pH meter. A pH below this range may result in a lighter colour, while a pH above the range may result in a darker colour, a bitter taste, more browning, a soapy mouthfeel or a limited mould free shelf life.

As indicated above, at least part of the surface of the dough, is provided with a fatty substance. As a fatty substance, in principle any lipid or emulsifier (which generally comprises a hydrophobic group, e.g. a fatty acid group, a hydrocarbon group or a group having a similar or higher hydrophobicity) may be used that is allowed to be used in a food application.

The fatty substance may be used as such or in combination with another substance, for instance the fatty substance may be provided on a carrier, for instance (wheat) starch or flour. Preferably, the fatty substance is used in combination with a drying agent. The drying agent has a drying effect at the surface of the dough. As a drying agent, in general hygroscopic substances, suitable for use in a food application, can be used. In particular, the drying agent may be selected from (wheat) flours and hygroscopic salts, such as a chloride or sulphate salt of sodium, potassium, magnesium or calcium.

In a specific embodiment, also one or more enzymes are applied to and also to at least a part of the surface of the dough. Such enzyme may be applied together with the fatty substance, before the fatty substance or thereafter. The enzyme may contribute to one or more desirable effects, as mentioned above. One or more enzymes belonging to the group of amylases, xylanases, proteases, lipases and oxidases. Amylases have a positive effect on rollability and foldability, proteases have a positive effect on diameter and stack height. Xylanases and lipases have a positive effect on dough characteristics and on whiteness of the tortillas.

In an advantageous embodiment, the enzyme is applied together with the fatty substance.

In particular, the fatty substances may be selected from (triglyceride) oils, fat flours, emulsifiers, hardened fats, shortenings, emulsified shortenings, waxes, lecithins, and combinations thereof, which are known for use in the preparation of baked products, such as tortillas.

More in particular, the fatty substance or emulsifier may be selected from the group of fatty acid monoglycerides, fatty acid diglycerides, fatty acid triglycerides, waxes, paraffins, sterols, sugar esters of fatty acids, polyglycerol esters, polysorbates, lecithins, succinilated and ethoxylated monoglycerides, stearoyl lactylates, mono- and diacetyl tartaric acid esters of mono- and diglycerides (DATEM's) and fat flours.

Suitable triglyceride oils and fats which may be used include in particular palm fat, palm oil, coconut oil, corn oil, cottonseed oil, canola oil, olive oil, peanut oil, safflower oil, soybean oil, sunflower oil, butter, lard and tallow, and other fats and oils which are suitable for use in food applications, e.g. oils from nuts or fruit seeds. Optionally a fraction of a (vegetable) triglyceride oil is used. A triglyceride oil used as a fatty substance is optionally partially or fully hardened.

The emulsifier fatty substance may in particular be a glyceride or a sugar ester of a fatty acid comprising one or more fatty acid residue chains having 2 carbon atoms or more.

Usually the fatty acid residue chains of a fatty substance used in accordance with the invention have 26 carbon atoms or less, in particular 22 carbon atoms or less. In particular for a low stickiness of the tortillas, it is preferred to use a fatty substance comprising one or more long chain (having more than 12 carbons in the chain) or intermediate long chain fatty acid residues (having 8-12 carbons in the chain).

The fatty substance is preferably applied as a liquid, e.g. liquid oil, or a (fine) powder, crystal, granule or agglomerate, e.g. (fine, free flowing) powdered fat, (fine, free flowing) powdered emulsifier, or (fine, free flowing) powder of fat on a carrier. This facilitates the fatty substance to be distributed evenly over the surface. A free-flowing powdered fatty substance may for instance have been obtained by spray drying or spray cooling.

In particular in case a powdered fatty substance is used, a fatty substance may be selected having a relatively low melting range of 20-40° C. This can be achieved by selecting fatty substances with intermediate long chain fatty acid residues (C8-C12) or fatty substances with high iodine number (which is a measure for the number of double bonds in the fatty acid chain, or in other words a low degree of saturation); both leading to lower melting points.

The oil or free flowing powders may be applied onto the surface of the dough by spraying (oil, or sprayable liquid fats), or by dredging, sprinkling, or scattering.

Usually at least a substantial amount of the free flowing powders has a particle size of less than 3000 μm; preferably less than 1000 μm, more preferably less than 500 μm, more preferably less than 300 μm, more preferable less than 100 μm and most preferably less than 10 μm. A substantial amount, as used herein in particular means at least 50%, in particular at least 90%, more in particular at least 95%, preferably at least 99% of the particles will pass a sieve with holes of said size.

The term "free-flowing" is used for a powdered material that is not sticky, and thus has no or hardly any tendency to clump or bridge in hoppers.

A solid fatty substance, in particular a solid triglyceride (mixture) may in particular be advantageous for maintaining a low stickiness, also after a prolonged period of storage, compared to a liquid fatty substance, such as a liquid oil.

Usually 10-100% of the surface of the surface is provided with the fatty substance. In particular, at least 20%, at least 40%, at least 50% or at least 75% of the surface may be provided with the fatty substance. This can be achieved by spraying the liquid or powder over the dough piece, after which it is turned around and sprayed again. A good result can be achieved, also without fully covering the surface of the dough, in particular by distributing the fatty substance essentially homogeneously over the surface.

Alternatively the fatty substance can be sprayed/sprinkled, dredged or scattered over the total dough piece just before moulding, dividing and shaping the small dough pieces which are fed into the tortilla machine.

The amount of fatty substance applied to said surface of the dough portion is usually at least 0.0001 g/g dough, in particular at least 0.0005 g/g dough. Preferably the amount is at least 0.001 g/g dough, more preferably at least 0.002 g/g dough or at least 0.0025 g/gram dough.

The amount of fatty substance applied to said surface of the dough portion is usually 0.01 g/g dough or less, in particular 0.005 g/g dough or less. Such an amount is generally sufficient to improve one or more properties, whereas the increase in fat content in the final product is limited. Thus, the invention allows manufacture of tortillas which can still be classified as low-fat tortillas, starting from low-fat dough.

A high level of fatty substance on the outside of the tortilla may contribute to an extra improvement in the quality of the product. A high level of fat may lead to an increase in blister formation during baking and an increase in tortilla stacking stickiness (compared to a method of the invention wherein a relatively low amount of fatty substance is used). For one or both of these reasons an amount of 0.0040 g/g dough or less, in particular of 0.0035 g/g dough or less may be preferred. The fatty substance may be applied to the dough piece, before, during or after resting, but in general before shaping (pressing).

The fatty substance may conveniently be applied in any way.

In an embodiment, the fatty substance is applied by the providing plates of a press used to shape the dough with the fatty substance and then pressing the dough. With this technique in particular it is easy to apply essentially the whole surface of the tortilla with fatty substance, thus providing optimal coverage of the surface with fatty substance.

Advantageously, the fatty substance is sprayed as a liquid or powder onto the surface of the dough. Spraying is an advantageous technique, because it can easily be done in a continuous preparation process and allows a good distribution of the fatty substance on the surface. Also, this technique is advantage in that the contact-time of the fatty substance with the (heated) pressing plate is kept at a minimum, thereby substantially avoiding degradation of the fatty substance, in case it is heat sensitive. Further, it is easy to avoid contaminating the equipment used for shaping (the press) with fatty substance.

In an embodiment, the fatty substance is applied by placing the dough portions on a surface provided with the fatty substance, for instance a surface on which the dough portions are allowed to rest. This is a preferred way of working when free flowing fat powder or emulsifier powders are used since it will lead to more homogeneous distribution of the fat over the surface, especially when the dough pieces are turned around halfway during resting.

Also, this technique is advantageous in that the contact-time of the fatty substance with the (heated) pressing plate is kept at a minimum, thereby substantially avoiding degradation of the fatty substance, in case it is heat sensitive. Further, it is easy to avoid contaminating the equipment used for shaping (the press) with fatty substance.

The shaping is usually done after having the dough allowed to rest. Shaping is preferably done by pressing the dough portions under a hydraulic press. The press is preferably heated to between 175° and 235° C. The skilled person will know to determine a suitable pressure. The press usually exerts 750-1,450 psi (5.2-10 Mpa) of pressure over the plates. Preferably the pressure is 200-3000 psi, more preferably 500-2000 psi, most preferably 750-1450 psi, flattening the ball of dough into the distinctive round, flat tortilla shape. Pressing time (press dwell time) usually is between 0.9 and 1.5 seconds, preferably the pressing time is at least 1.1 sec. Preferably the pressing time is 1.4 sec or less.

After shaping, the tortilla is baked. This can be done in a manner known per se, e.g. as described above.

As indicated above, the invention further relates to a tortilla obtainable in accordance with the invention.

Fat contents may be chosen in a wide range, as indicated above. Usually, the tortilla has an added fat content of 20 wt. % or less. In particular, the added fat content may be 15 wt. % or less, 10 wt. %, or 9 wt. % or less.

In an advantageous embodiment, the tortilla has a relatively low added fat content, such as an added fat content of 5 wt. % or less, in particular of 2.5 wt. % or less more in particular of 2 wt. % or less based on flour weight.

EXAMPLES

The invention will now be further illustrated by the following examples.

Example 1

Tortillas have been prepared according to the following recipe and preparation method:

| Ingredients | Parts by weight | % (based on flour) |
|---|---|---|
| Flour | 1000 | 100 |
| Water | 540 | 54 |
| Salt | 15 | 1.5 |
| Shortening | 90/20* | 9/2* |
| Baking powder: 2403 FY | 20 | 2 |
| Fumaric acid | 3 | 0.3 |
| Sorbic acid | 3 | 0.3 |
| Calcium propionate | 5 | 0.5 |
| SSL | 2.5 | 0.25 |
| L-cysteine | 0.02 | 0.002 |

*90 parts for regular-fat tortilla; 20 parts for low-fat tortilla

Baking powder 2403 FY is a product from Fleischmann (USA) and contains: <40 wt % disodium pyrophosphate; <10 wt % calcium dihydrogen phosphate; <40 wt % sodium hydrogen carbonate.

Processing

Mixing: 2 min. slow 5 min. high speed with a McDuffy mixerDough temperature: 30° C.
Dough weight: 1500 g.
Resting time: 2 min.
Dividing/shaping: Automatic dividing/round up in 30 dough pieces of 50 g each with a W&P Rotomat GS50
Resting time: 5 min. at room temp. on clothed plate.
Lawrence Equipment semi automatic tortilla machine.
Dwell time: 1.2 sec
Dwell temp.: 400° F. and 415° F. bottom/top
Baking temp.: between 400° F.-415° F., two top burners on
Baking time ca.: ca 25 sec.
Cooling: Ca. half an hour.
Wrap: 10 pieces in a bag.
The following examples of fatty substances have been evaluated
Revel bake (fractionated, non hardened palm fat), Loders Croklaan, Netherlands
Monoglyceride (Abimono 90 HPF), Abitec, UK
MCT (medium chain triglyceride) oil, Bergabest 60/40, Sternchemie, Germany
Vana Grassa (80% fractionated palm oil, melting point 44° C.). Kievit, Netherlands
Fat flour (50/50 blend of wheat flour with fat). Cereform, UK
Mighty Soft (monoglyceride with high iodine number), Kerry Ingredients, UK
Various (50/50) combinations of the above.

The fatty substance have been applied (about 0.004 g/g dough or less) using one the following methods:
Spraying liquid
Dredging/sprinkling/scattering powder.
Dredging powder before dividing and shaping
Sprinkling free flowing fat powder on the plates on which the dough pieces are left for a dough rest and turning the dough pieces halfway the rest period.

Each of the tested fatty substance led to an improvement in one or more properties. In particular rollability, foldability, fluffiness, shape, opacity, stack stickiness and/or whiteness (as evaluated by a test panel) were in general improved, in these experiments. Also, tortilla diameter was generally increased and stacking height was the same or increased, compared to the conventional process.

Also shelf-life was in general improved. Shelf life stability was evaluated using the rollability test during storage at 22° C. Tortillas were wrapped around a dowel (1 cm diameter) and cracking and breaking was evaluated by trained personnel using a scale from 1 (broken immediately, impossible to roll) to 5 (no cracks or breakage). Tortilla shelf life was defined as the number of days the tortilla could be rolled without substantial breaking; in other words, the time at which the rollability reached a score of 3.

The following table gives an indication of the improved results (average for all experiments).

| Type | Rollability | Foldability | Diameter | Fluffiness | Shape | Opacity % | Stacking height | Stack stickiness | Whiteness | Shelf Life (days) |
|---|---|---|---|---|---|---|---|---|---|---|
| Regular tortillas | 7.5 | 7 | 17-18 | 7 | 7.5 | 75 | 0.9-1.0 | 7.5 | 7 | 9 |
| Low fat tortillas | 6.5 | 6.5 | 16-17 | 5 | 7 | 60 | 1.0-1.2 | 7 | 6 | 7 |
| Tortillas (regular or low fat) according to invention | 8-8.5 | 8-9 | 19-20 | 7.5-8.5 | 7-8 | 75-90 | 0.8-0.9 | 8-9 | 7-8.5 | 10-12 |

More specifically, the following conclusions were drawn from the experiments:

Intermediate chain fatty substances having a relatively low melting temperature or melting range showed in particular a positive effect on stack stickiness.

Monoglycerides showed in particular a positive effect on stack height.

The combination of fatty substance with a carrier (flour) showed in particular a positive effect on diameter and stickiness.

It was further concluded that for fat powders the largest effects on external quality parameters (diameter, shape, opacity, blistering, colour) and on the structural quality parameters (rollability, etc. and shelf life) was achieved when the powder was essentially homogeneously distributed over the surface.

The invention claimed is:

1. A method for preparing a soft, rollable, wheat flour tortilla comprising
providing a wheat flour tortilla dough in a portion sufficient to prepare the tortilla;
applying a fatty substance to all or at least part of the surface of the dough portion, wherein the fatty substance is a powder, granulate or crystal; thereafter forming the dough into a tortilla shape using a hot press; and thereafter baking the dough;

wherein the amount of fatty substance applied to said surface of the dough portion is in the range of 0.0001 g/g dough to 0.01 g/g dough, and wherein the dough is made using flour having a protein content of about 7.5 to about 14 wt %.

2. The method according to claim 1, wherein the tortilla has a fat content of at least 5 wt. %.

3. The method according to claim 1, wherein the tortilla is a full fat tortilla where the ingredient fat content is 20 wt. % or less, based on flour weight.

4. The method according to claim 1, wherein the amount of fatty substance applied to said surface of the dough portion is in the range of 0.0015 g/g dough to 0.004 g/g dough.

5. The method according to claim 1, wherein the amount of fatty substance applied to said surface of the dough portion is in the range of 0.0025 g/g dough to 0.0035 g/g dough.

6. The method according to claim 1, wherein the fatty substance is applied by contacting the dough portion with a surface provided with the fatty substance.

7. The method according to claim 1, wherein fatty substance is applied by dredging, sprinkling or scattering a fatty substance powder over the dough portion.

8. The method according to claim 1, wherein at least one fatty substance is used selected from the group of monoglycerides, diglycerides, triglycerides, waxes, paraffins, sterols, sugar esters of fatty acids, polyglycerol esters, fat flours, polysorbates, lecithins, succinilated monoglycerides, ethoxylated monoglycerides, emulsified shortenings, emulsifiers, such as DATEM or sodium-stearoyl-lactate (SSL), surfactants and combinations thereof.

9. The method according to claim 1, wherein the fatty substance is applied as a fatty substance on a carrier, wherein the carrier is a powder or a ground substance.

10. The method according to claim 9, wherein the carrier is a cereal flour or starch.

11. The method according to claim 9, wherein the carrier is calcium sulphate or calcium carbonate.

12. The method according to claim 1, wherein the fatty substance is applied in combination with one or more enzymes selected from the group of amylases, xylanases, proteases, lipases and oxidases.

13. The method according to claim 1, wherein the enzyme is applied encapsulated within the fatty substance.

14. The method according to claim 1, wherein the fatty substance is applied in combination with a drying agent selected from the group consisting of hygroscopic salts and flour.

15. The method according to claim 1, wherein the fatty substance is blended with a least one component selected from the group consisting of drying agents, starches, anti-caking agents, emulsifiers, proteins or gums is applied as spray dried or spray cooled free flowing powder.

16. The method according to claim 1, wherein the fatty substance is evenly distributed over the surface of the dough.

17. The method according to claim 1, wherein the dough portion is baked for approximately 30 seconds at a temperature of about 190-230° C.

18. A method for preparing a soft, rollable, wheat flour tortilla, comprising providing a wheat flour tortilla dough;

applying a fatty substance to all or at least part of the surface of the dough, wherein the fatty substance is a powder, granulate or crystal; thereafter dividing the dough in portions sufficient to prepare the tortilla;

forming the dough portions into a tortilla shape using a hot press; and thereafter baking the tortilla shaped dough portions;

wherein the amount of fatty substance applied to said surface of the dough portion is in the range of 0.0001 g/g dough to 0.01 g/g dough, and wherein the dough is made using flour having a protein content of about 7.5 to about 14 wt %.

* * * * *